H. STANLEY.
Heating Stove.
No. 958. Reissued May 8, 1860.
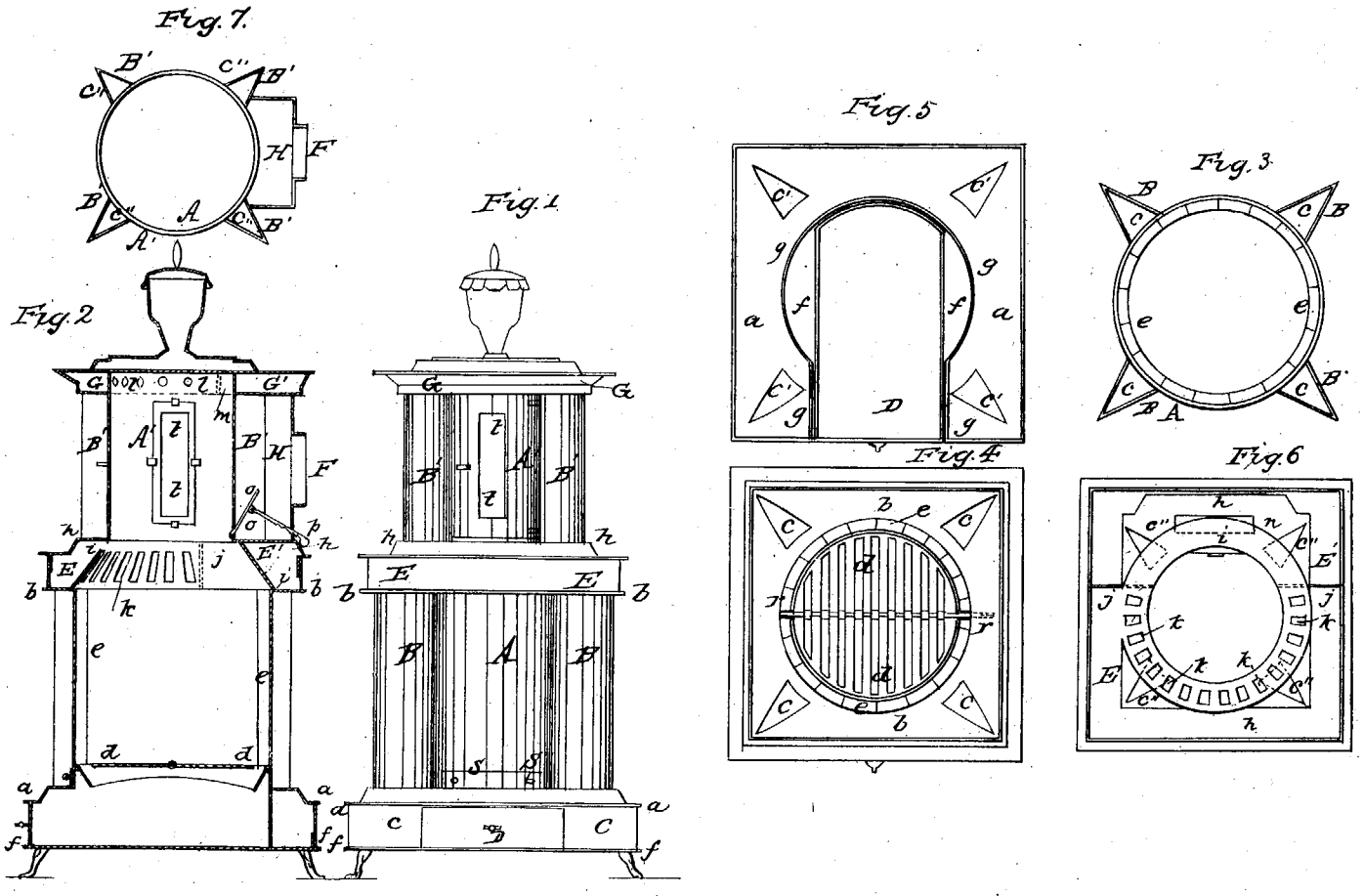
N. PETERS, Phot.-Lithographer, Washington, D. C.

UNITED STATES PATENT OFFICE.

CHARLES EDDY AND JACOB SHAVOR, OF TROY, NEW YORK, ASSIGNEES OF HENRY STANLEY.

IMPROVEMENT IN COAL-STOVES.

Specification forming part of Letters Patent No. 3,876, dated January 4, 1845; extended 7 years; Reissue No. 944, dated April 10, 1860; Reissue No. 958, dated May 8, 1860.

*To all whom it may concern:*

Be it known that HENRY STANLEY, of West Poultney, county of Rutland, and State of Vermont, did, on the 4th day of January, A. D. 1845, obtain of and from the United States of America certain Letters Patent for and upon new and useful improvements in a stove or apparatus for heating apartments, and denominated therein "Stanley's Coal-Burner," and bearing the title of "Improvement in Coal-Stoves," which was extended in conformity to law on the 4th day of January, A. D. 1859, for a term of seven years from and after the said 4th day of January, 1859, and which renewed or extended Letters Patent was duly assigned to CHARLES EDDY and JACOB SHAVOR, each of the city of Troy, county of Rensselaer, and State of New York, (and each of the firm of Charles Eddy & Co., of said city, &c.,) by John Stanley, sole assignee of the said HENRY STANLEY; and which renewed or extended patent was reissued to the said CHARES EDDY and JACOB SHAVOR on the 10th day of April, A. D. 1860, wherein and whereby the said CHARLES EDDY and JACOB SHAVOR became patentees under and by virtue of the aforesaid assignments, by which assignments they became and are the true and lawful owners and holders of the entire invention, improvements, and patent, as renewed and extended for the said term of seven years.

We, the undersigned patentees, do hereby declare that the following is a full and exact description of the said invention and improvements, reference being had to the accompanying drawings, and to the letters of reference marked thereon, making a part of this specification, in which—

Figure 1 is a front elevation of the "coal-burner". Fig. 2 is a vertical section through the center from front to rear. Fig. 3 is a horizontal section through the fire-chamber. Fig. 4 is a horizontal section showing the grate of the fire-chamber. Fig. 5 is a horizontal section through the plinth, showing the ash-pit and drawer or ash-pan D. Fig. 6 is a horizontal section showing the conical grate *i* at the top of the fire-chamber, the view being taken from below, looking upward into the upper section.

The improvements consist in the construction of the several parts in the combination as a whole, and in the subcombinations thereof, consisting of a chamber of combustion, a surmounting chamber, and of flues with a peculiar arrangement, and the connections therewith, by which the heat is more perfectly radiated and the fuel better economized than has been heretofore effected, the construction, combination, and combinations being cheap, durable, compact, and ornamental.

The exterior of the coal-burner is composed of a square plinth or base elevated and resting upon four legs. On this plinth or base rests the chamber of combustion, which is surrounded by a square cornice or abacus denominated "a surmounting chamber," upon which is placed a cylinder smaller than the one below, which forms the chamber of combustion, which upper cylinder forms an upper section or story capped with a cornice of proportionate dimensions with the one below upon the lower and first section or story. Four columns rise from the said plinth or base to the said cornice, abacus, or surmounting chamber, and four columns rise from the said cornice, abacus, or surmounting chamber to the upper cornice of the upper section or story. The said columns are each and every of them triangular. The exterior surface of each of them may be flat or somewhat convexed. The upper columns are of smaller dimensions than the ones below. The whole may be surmounted with an urn, thus harmonizing and perfecting the outline of the whole, and forming a radiator of greatly-extended surface and compact form in which the surfaces of radiation do not intefere or counteract each other.

The details of the interior are as follows, to wit: The center portion of the plinth or base has an ash-pit in it, into which the ash-pan D slides in front. This ash-pit is separated from the exterior chamber, *a*, which surrounds three sides of it, as represented at Fig. 5. The division is formed by the projection of the fire-cylinder A through the top plate and downward to the bottom plate of the plinth or base, as shown at *g*, same figure. The fire-cylinder A, which forms the chamber of combustion, is lined with fire-proof brick from the plinth or base to the cornice, abacus, or surmounting chamber E, as seen at *e*, Figs. 2 and 3. At the top of the said cylinder A there is a cone-shaped ring, *i*, more clearly seen at Fig. 6, the base of which is of the diameter of the lower and fire cylinder, A. It is contracted at the top so as to correspond and conform to the size of the smaller and upper cylinder, A′. The breadth of the said cone-shaped ring is equal to the depth of the cornice, abacus, or surmounting chamber E, by which it forms an annular chamber entirely around the heater. The anterior portion of this cone-shaped ring *i* is pierced with oblong apertures, forming the grating *k*, which extends over and upon about two-thirds of its circumference, thus forming a communication between the surmounting chamber E and the upper part of the said fire-chamber. The said cone-shaped grate *i* may be perforated with holes of any required form or size, and thus and thereby form a communication from the said fire-chamber into the said chamber E. The said ring *i* may be otherwise constructed to answer and accomplish the same purpose as herein described. Immediately in the rear of the said grating *k* there is a partition on each side, as seen at *j*, Figs. 2 and 6, which divide the said chamber into two unequal parts. The triangular flues B, hereinbefore named, each open at the upper end thereof into the surmounting chamber E, and at their respective lower ends into the chamber in the plinth or base, as seen at *c*′, Figs. 4 and 5. The front flues B communicate with the front division of the said chamber E, and the rear flues B open into the rear portion of the said chamber E. The cone-grate *i* is intended for and does accomplish three very important purposes at least, the first of which is the protection of the said chamber E and the said flues B from and against the entrance of coal or ashes therein, by which they would become clogged; second, the grating or perforation hereinbefore specified diffuses the heated products of combustion into the said chamber E, and thus spreads out to the whole surface of the radiating-chamber E the heat from the fire before the gases descend to the plinth or base; and third, the outer surface of the said chamber E is shielded from the direct action of the heat arising from and by reason of the coal or fire in the said fire-chamber, whereby rapid and undue destruction of the iron, and the injurious effect upon the external atmosphere, caused by the too highly-heated iron, is prevented.

In the front of the cylinder A there is a draft port or opening directly opposite and may extend a little above or a little below the top part of the said grate, as the case may require, which grate is surrounded by a shell or conical ring descending downward and below the said draft port or opening to any required distance, and more clearly seen at *x*, Fig. 2. The air enters the said draft-port *s*, impinges upon and against the said shell *x*, around which it circulates, becomes highly heated by virtue thereof, and while in a diffused and heated state or condition descends down upon and under the said shell *x* at all points thereof and around the said grate, and thence rises to supply heated air to the fire for the purpose of aiding, facilitating, and promoting the combustion, and to increase the volume or quantity of heat from a small amount of fuel. By this arrangement there is a space between the said shell *x* and the outer plate of the stove in which the air is heated, as hereinbefore stated, preparatory to its entrance under the fire, all of which form a combination for the purpose above stated.

The cylinder A′, which is entirely open to and into the lower cylinder at the bottom part thereof, has openings surrounding the front portion of its top, which communicate with the chamber in the cornice G′. This chamber is divided like the said chamber E, by plates *m*, Fig. 2. The radiating corner flues, B′, open into the said cornice G at the top thereof and into the said chamber E below and at the bottom thereof. The purpose of this arrangement is twofold: First, by means thereof the radiating-surfaces are materially extended; and, second, the deleterious gases rising into this chamber A′ from the fuel are drawn off, descend into the said chamber E, and thence follow the main current through the flues B, and thus are prevented from entering into the apartment. In the front of cylinder A′ there is a door through which fuel is supplied to the fire, and in this door, as well as in the two sides of the said cylinder, there is an open-work panel, into which mica is inserted to show the fire or light therefrom. In the rear part of the top plate, *h*, of the said chamber E there is an opening, *n*, as seen at Fig. 6, made of a proper size to insure a perfect draft. This opens into a chamber, H, which is formed in the rear of the cylinder A′. This has an opening and collar, F, for the attachment of a smoke or exit pipe, as in ordinary stoves. An opening is made from the said cylinder A′ directly into the said chamber H, thereby forming a direct draft to the exit-pipe at F, which is for the purpose of facilitating the kindling of fires, or for any other purpose desired. This opening regulates or changes the current of the draft by means of a damper, which opens into the said chamber H. This damper is lettered *o* in Fig. 2. It is moved by a stem, P, which projects through the back of the chamber H. When this damper *o* is closed, the course of the draft is downward through the front flues, B B′, back and along the side chambers of the plinth or base, thence upward and through the back flues, B, into the chamber H, into and through the rear part of the said chamber E, the gases in the upper cylinder, A′, being drawn down by the current below.

Having thus described the original invention of the aforesaid HENRY STANLEY for improvements in coal-burners, what we claim as his invention and improvements therein is—

1. The manner in which he arranged and combined as a whole the two sections or stories thereof, consisting of two cylinders, each with four triangular radiating-flues arranged around and in contact with the same, one at each corner of the said plinth or base, which flues communicate with the flue-space in the plinth or base, with the intermediate chamber, E, and with the cornice-space G, as herein described and set forth.

2. The combination of the grate *i* with the intermediate chamber, E, substantially as and for the purposes herein set forth.

3. The combination of the upper section or story and the flues arranged and connected therewith, with the intermediate chamber, E, or its equivalent, as and for the purpose herein specified.

4. The combination of the said shell or projection *x* with the said opening *s* to diffuse and heat the air preparatory to its entrance under and into the fire to aid, facilitate, and promote the combustion of the fuel, and to increase the volume or quantity of heat by means thereof, as herein described.

5. The combination of the chamber H, having therein the damper *o*, and thereto attached the exit-pipe F, with the intermediate chamber, E, and the cornice G, as herein described and set forth.

In testimony whereof we have, on this 28th day of April, 1860, hereunto set our hands.

CHARLES EDDY.
JACOB SHAVOR.

Witnesses:
MARCUS P. NORTON,
HENRY STANLEY.